Nov. 10, 1970  A. RAVERA  3,539,280
ENDOTHERMIC ROTARY ENGINE WITH SHIFTABLE BLADES
Filed Feb. 7, 1968  2 Sheets-Sheet 1

INVENTOR
Alfredo Ravera
BY
Jecies and Greensich
ATTORNEY

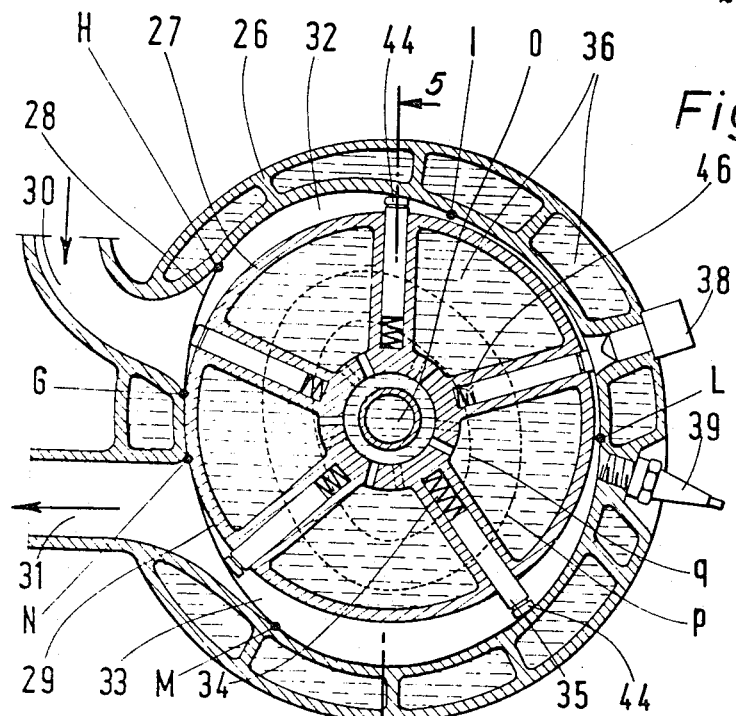
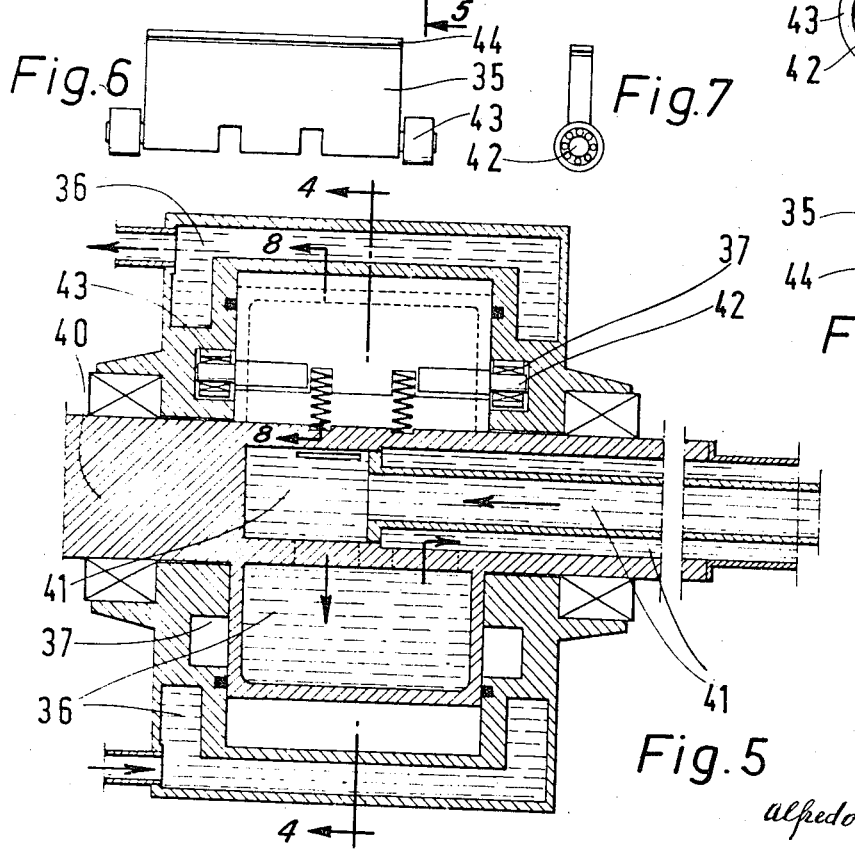

United States Patent Office 3,539,280
Patented Nov. 10, 1970

3,539,280
ENDOTHERMIC ROTARY ENGINE WITH SHIFTABLE BLADES
Alfredo Ravera, Lungomare Triesti 26, Salerno, Italy
Filed Feb. 7, 1968, Ser. No. 703,737
Int. Cl. F02b 53/10, 55/04, 55/14
U.S. Cl. 418—91
9 Claims

ABSTRACT OF THE DISCLOSURE

An endothermic rotary engine with a rotor and a stator and blades radially shiftably mounted in the stator or the rotor. The outside surface of the rotor or the inside surface of the stator has an eccentric configuration and the blades divide the intermediate space between rotor and stator into a plurality of compartments which produce the various phases of operating cycles in each revolution of the rotor.

---

The present invention relates to an endothermic rotary engine comprising, according to a first embodiment, a circular section stator in which a rotor having a cylindrical outside surface with an eccentric profile and provided with internal intake and exhaust cavities is rotatably mounted, the cavities together with a plurality of radial blades secured to the stator and shiftable therein in suitable housings dividing the intermediate space existing between the rotor and stator into compartments of variable volume to produce the various successive phases of one or more cycles of operation for each revolution of the engine.

According to another embodiment, the engine comprises a cylindrical eccentric section stator with intake and exhaust channels and a rotor rotatably mounted therein, having a cylindrical outer surface of circular profile and provided with a plurality of radial blades shiftable therein in suitable housings and dividing the intermediate space between rotor and stator into compartments of variable volume to produce the various successive phases of one or more cycles of operation for each revolution of the engine.

Other particulars and advantages of the invention will appear from the following description with reference to the accompanying drawings cited by way of a non-limiting example for an engine with five working compartments of variable volume, and this description will make it clear how the present invention can be carried out, the details resulting from the text and the drawings forming, of course, part of the same.

FIG. 4 shows a second embodiment of the engine in a transverse section taken on the line 4—4 in FIG. 5;

FIG. 5 is a longitudinal section taken on the line 5—5 in FIG. 4;

FIG. 6 is a front view of a blade of this embodiment;

FIG. 7 is a side view thereof, and

FIG. 8 is a section taken on the line 8—8 in FIG. 5 and showing the blade on an enlarged scale.

Figure 1:
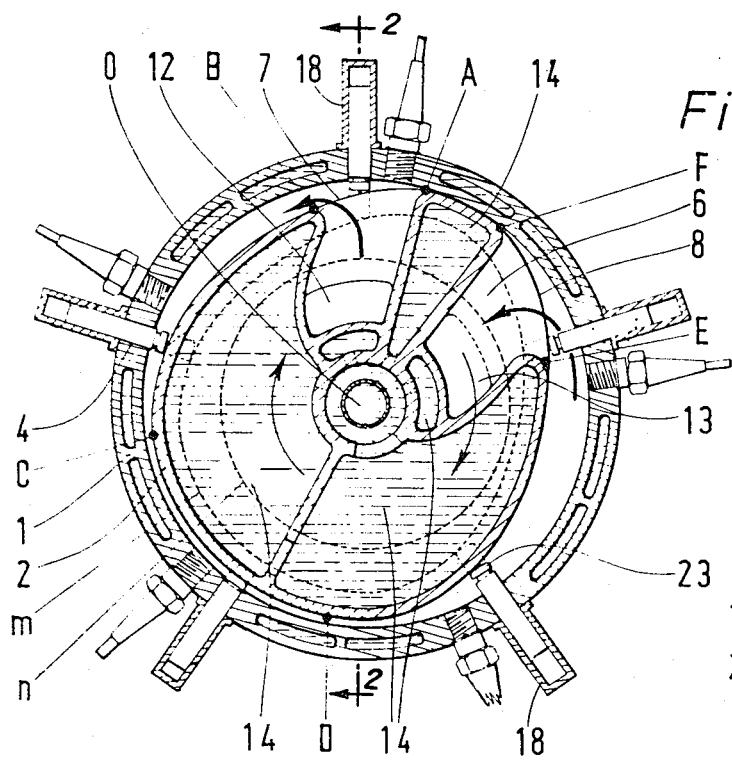
FIG. 1 shows a first embodiment of the engine in a transverse section taken on the line 1—1 in FIG. 2.
Figure 3:
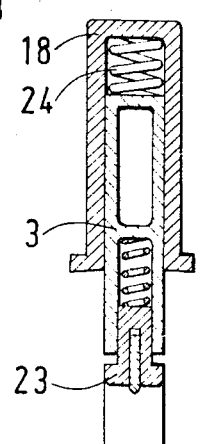
FIG. 3 is a section taken on the line 3—3 in FIG. 2 and showing a blade on an enlarged scale.
Figure 2:
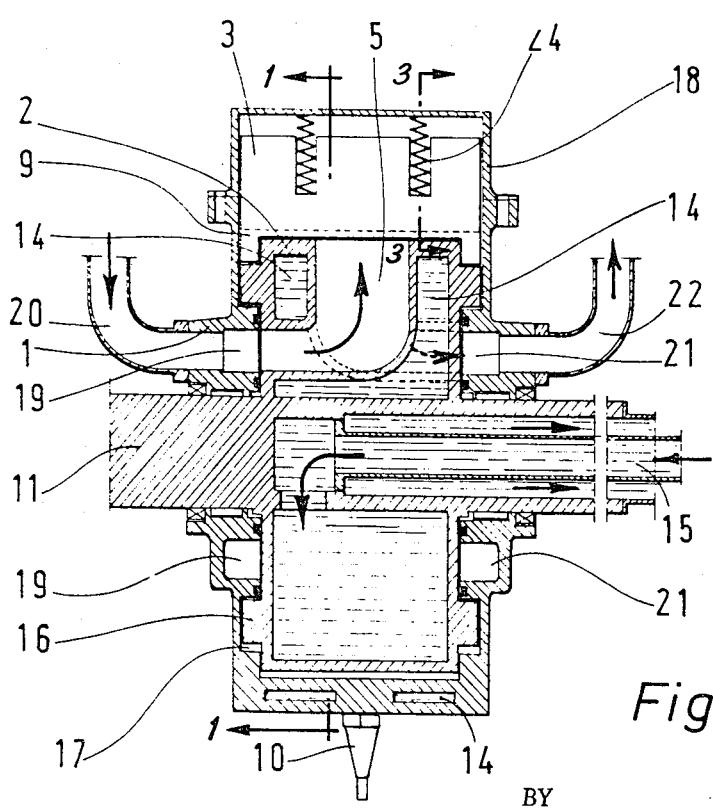
FIG. 2 is a longitudinal section taken on the line 2—2 in FIG. 1.

Referring to the first embodiment, the engine is substantially composed of three cooperating parts:

(a) a stator 1 formed of a circular section cylinder;
(b) a rotor 2 having a cylindrical outer surface with eccentric profile;
(c) a series of five radial equidistant blades secured to the stator and shiftable therein.

The section A-F and C-D of the eccentric profile A-B-C-D-E-F of the rotor 2 are two arcs of a circle of different radii with the centre in O, the central point of the stator cylinder. The sections A-B-C and D-E-F have curvatures different from one another. Thus, the complete circle of this profile is composed of a succession of curve sections with variable orthogonal radii (except the two circular sections) and such that the maximum distance of the curve D-E-F from the stator cylinder is greater than that of the curve A-B-C of this cylinder and the length of the former is greater than that of the latter.

The rotor 2 rotates freely between the lateral end walls. This rotor is formed integrally with the driving shaft 11 and has in its interior the intake chamber 5 and the exhaust chamber 6 which on the cylindrical outside surface of the rotor 2 have the openings 7 and 8, respectively, communicating laterally of the rotor, the former with the intake cavity 12 opening at one end wall of the rotor and the latter 13 with the opposite wall.

The rotor 2 is further provided with the separate cooling chambers 14—14 communicating with the axial cavities 15—15 of the driving shaft 11. The cooling inside the cooling chambers 14—14 can be regulated differently from one another.

A further feature of the rotor 2 is that an eccentric annular lug 16 projects from each end wall and has an outer surface (indicated by the dash line m in FIG. 1) eccentric to the profile of the rotor, whereas its inner surface is cylindrical but with circular section (shown in FIG. 1 by the circle n in dash lines.

The stator 1 is closed laterally by the end walls which define its length and in the cylindrical portion has five rectangular slots 4 arranged at equal distances from one another and parallel to the driving shaft. The length of the slots 4 is greater than the distance between the end walls to form the cavities 9 which extend towards the centre O.

The end walls further contain the grooves 17 for receiving the eccentric annular lugs 16 which project laterally from the discs and define the length of the rotor 2.

On the outside of the stator 1 the radially disposed rectangular boxes 18 for receiving the blades 3 are secured adjacent the slots 4.

One end wall of the stator 1 opposite the intake cavity 12 communcates with the annular intake collecting channel 19 connected to the intake channel 20 from the carburetor. The other end wall opposite the exhaust cavity 13 communicates with the exhaust collecting channel 21 connected to the exhaust collecting conduit 22.

The blades 3 are accommodated in the slots 4, the corresponding boxes 18 and the recesses 9 in which they run radially towards the centre and vice versa with the reciprocating movement; their inner edge formed by the skid 23 slides constantly on the rotating surface of the rotor. The blades 3 divide the intermediate space existing between the rotor and the stator into five compartments and are controlled during the centrifugal movement by the two eccentric lugs 16 acting upon the tappets 25 formed by two lateral extensions of the blade and sliding in the corresponding radial recesses 9. The blades 3 themselves are returned by springs 24.

In the cylindrical portion of the stator 1 five spark plugs 10 are arranged adjacent the blades 3.

The operation of the engines is as follows:

Considering the rotating movement of the rotor 2 as being in clockwise direction, the combustible mixture coming from the carburetor and flowing through the conduit 20 into the collecting channel 19 is introduced through the chamber 12 of the rotor into the chamber 5. Then the mixture passes through the chamber 7 and gets into the compartments which are successively opposite the arc A–B, in which the rotor 2 produces a rarefaction of the fluid and so begins the intake phase which terminates when the point B is located at the next blade (in the direction of rotation) because communication with the chamber 5 is interrupted.

From this position begins, in the compartment between B and the successive blade, the compression phase produced by the gradual reduction of its volume along the arc B–C and this phase terminates when the compartment occupies the circular crown C–D.

Each time the point D passes a blade 3 the adjacent spark plug 10 causes the ignition of the mixture contained in the circular crown C–D which forms the ignition chamber in the compartment which in that particular moment occupies this crown.

In the compartments along the section D–E the expansion phase takes place while the compartments undergo a gradual amplification of volume and in these compartments the pressure of the burnt gases acts upon the rotor through a resulting force which does not pass through the axis so as to produce a considerably active torque.

The exhaust phase is effected in the compartments which are successively opposite the arc E–F where the opening 8 is located through which the burnt gases are removed which escape from the chamber 6, cavity 13, annular collecting channel 21 and exhaust conduit 22.

In the meantime, the succession of the phases takes place simultaneously in each compartment so that five complete cycles are carried out in each revolution of the engine.

It should be noted that the volume of the compartments in the expansion phase is larger than that of the compartments in the intake phase and this ensures a better utilization of the expansive force of the burnt gases which are removed completely due to the absence of detrimental space, which causes the intake to assume its total value.

The second embodiment illustrated in FIGS. 5, 6, 7, 8 substantially consists in that the stator 26 is made eccentric and the rotor 27 is made cylindrical.

For this purpose the eccentric profile of the stator G–H–I–L–M–N is similar to the profile A–B–C–D–E–F of the rotor 2 (FIG. 1) of the first embodiment and is provided with the openings 28 and 29 communicating with the intake conduit 30 and the intake compartment 32, and with the exhaust conduit 31 and the compartment 33 in the exhaust phase, respectively.

The cooling chambers 36 of the stator 26 can be regulated with a differing cooling effect from one chamber to the other.

The rotor 27 in this embodiment is formed by a circular section cylinder enclosed by the stator 26 and rotates together with the driving shaft 40 integral therewith.

Five radially disposed equidistant cavities 34 for accommodating the blades 35 are provided in the rotor 27 and in each of these cavities a movable blade 35 is shiftably mounted to divide the intermediate space between rotor and stator into five compartments. The other cavities of the rotor 27 and stator 26 form the cooling chambers 36 of which those in the rotor communicate with the conduits 41 provided in the interior of the driving shaft 40.

The end walls of the stator are provided with an annular groove 37 (indicated by the curves in dash lines p, q in FIG. 4) having an eccentric profile similar to that of the surface G–H–I–L–M–N. An injector 38 and a spark plug 39 are secured to the stator.

The blades 35 slide in their housings and are provided with lateral pivots 42 for mounting rollers 43 which are freely rotatable thereon, project from the end walls of the rotor and are received in the eccentric annular grooves 37 in the stator where they are constrained to follow their paths by the rotation of the rotor and impart to the blades the reciprocating movement so that the sliding skids 44 of the blades will follow the eccentric profile of the stator on which they slide over the entire surface. Springs 46 located in the housings 34 ensure the engagement of the rollers on the outer surface of the annular grooves 37.

The blades in this engine have the same function as that described for the preceding one.

On examining the profile of the eccentric surface G–H–I–L–M–N of the stator it will be noted that, similarly to what has been said for the first embodiment: (a) the sections N–G and I–L are formed by arcs of circles of different diameters having the centre O on the driving shaft, the former engaging the circular profile of the rotor, the latter being slightly spaced therefrom, and the intermediate space existing therebetween assumes the form of a circular crown; (b) the sections G–H–I and L–M–N are two different curves each having a particular configuration.

As the rotation of the rotor is right-handed it follows that each blade on passing the point G causes a rarefaction in the compartment between G and the blade itself and thus produces the suction of the fluid which continues in the compartment until the next blade arrives at the point H.

From this position begins along the curve H–I the compression phase which terminates when the compartment reaches the annular crown I–L thus forming the compression chamber.

According to a modification for injection type engines the fluid taken in is air and the stator is provided with an injector 38 for the introduction of the fuel.

A spark plug 39, suitably positioned, produces the ignition of the mixture as soon as the blade has passed the point L so that the combustion chamber is formed by and extends over the length of the adjacent compartment.

The working expansion phase is effected in the compartments along the arc L–M. Finally, the compartments located in the section M–N are in the exhaust phase; the burnt gases are expelled through the conduit 31.

Also in this engine a cycle of four phases is carried out in each compartment during each revolution and five complete cycles are carried out simultaneously.

Obviously engines can be produced in which more cycles are carried out per each revolution in each compartment by changing the eccentric profile of the aforedescribed engines so that it is formed by a double, triple or more series of complete eccentric curves each comprising two waves similar to the ones already described so that the cycles will be carried out in each half, one third and so forth of the revolutions of the engine.

What I claim is:
1. An endothermic rotary engine, comprising:
a stator having an interior chamber bounded by an inner circumferential surface;
a rotor mounted in said chamber for rotation about a predetermined axis and having an outer circumferential surface facing said inner circumferential surface, one of said surfaces having a cylindrical and the other of said surfaces having a substantially oval but assymmetric profile and defining with said one surface a circumferentially incomplete annular gap including a first divergent-convergent portion extending from a region of zero clearance to a region of minimum clearance, and a second convergent-divergent portion extending from said first portion in said region of minimum clearance to said region of zero clearance and having a larger volume than said first portion;
inlet and outlet means respectively communicating with the divergent part of said first portion downstream of said region of zero clearance and with the con- vergent part of said second portion upstream of said region of zero clearance;

and a plurality of radially shiftable sealing elements carried by said stator projecting said outer circumferential surface into yieldable sealing engagement with said inner circumferential surface to thereby subdivide said annular gap into a plurality of compartments of variable volume to produce the successive phases of at least one cycle of operation during each revolution of said rotor.

2. An engine as defined in claim 1, wherein said one surface is said inner circumferential surface.

3. An engine as defined in claim 1, wherein said one surface is said outer circumferential surface.

4. An engine as defined in claim 1, wherein said other surface comprises a plurality of circumferentially successive surface portions having different radii of curvature.

5. An engine as defined in claim 1, wherein said sealing means comprises five radially extending circumferentially equidistantly spaced blades, said stator including five equidistantly spaced radial recesses extending inwardly of said outer circumferential surface and each retractably accommodating one of said blades; and biasing means resiliently biasing said blades radially outwardly of the respective recesses.

6. An engine as defined in claim 1, further comprising internal cooling compartments in said stator and said rotor, respectively; and cooling fluid supply means communicating with said cooling compartments.

7. An engine as defined in claim 1, wherein said sealing elements are radially extending blades.

8. An engine as claimed in claim 7, wherein the blades in their reciprocating radial sliding movement in their housings are guided in seats of corresponding profile provided laterally of the ends of the rotor and stator.

9. An engine as claimed in claim 7, wherein the blades are adapted to be moved by an outer eccentric on the stator in cooperation with tappets connected to the blades.

References Cited

UNITED STATES PATENTS

| | | | |
|---|---|---|---|
| 167,489 | 9/1875 | Adams | 103—123 |
| 1,440,451 | 1/1923 | Ford | 123—14 |
| 1,839,275 | 1/1932 | Sweningson. | |
| 2,015,027 | 9/1935 | Finley | 123—14 |
| 2,214,833 | 9/1940 | Hocker | 123—14 |
| 2,366,213 | 1/1945 | Pover. | |
| 2,507,151 | 5/1950 | Gabriel | 91—105 |
| 2,583,633 | 1/1952 | Cronin | 123—14 |
| 2,771,860 | 11/1956 | Falk. | |
| 3,286,698 | 11/1966 | Peras. | |

MARK NEWMAN, Primary Examiner

A. D. HERRMANN, Assistant Examiner

U.S. Cl. X.R.

418—186, 248